United States Patent [19]

Levien

[11] Patent Number: 5,276,535
[45] Date of Patent: Jan. 4, 1994

[54] METHOD AND APPARATUS FOR HALFTONING OF IMAGES USING GRAYSCALE ERROR DIFFUSION

[76] Inventor: Raphael L. Levien, P.O. Box 31, McDowell, Va. 24458

[21] Appl. No.: 814,880

[22] Filed: Dec. 24, 1991

[51] Int. Cl.⁵ .............................................. H04N 1/40
[52] U.S. Cl. ...................................... 358/456; 358/458
[58] Field of Search ............... 358/454, 455, 456, 457, 358/458, 459, 465, 466, 298, 533, 536, 534

[56] References Cited

U.S. PATENT DOCUMENTS

| | | |
|---|---|---|
| 4,051,536 | 9/1977 | Roetling . |
| 4,245,258 | 1/1981 | Holladay . |
| 4,246,614 | 1/1981 | Knox . |
| 4,633,327 | 3/1986 | Roetling . |
| 4,654,721 | 3/1987 | Goertzel et al. . |
| 4,673,971 | 6/1987 | Ikuta et al. . |
| 4,700,235 | 10/1987 | Gall . |
| 4,821,109 | 4/1989 | Roe . |
| 4,823,189 | 4/1989 | Haines et al. . |
| 4,916,545 | 4/1990 | Granger . |
| 4,918,622 | 4/1990 | Granger et al. . |
| 4,924,301 | 5/1990 | Surbrook . |
| 4,977,458 | 12/1990 | Granger et al. . |
| 4,985,779 | 1/1991 | Gall . |
| 5,014,333 | 5/1991 | Miller et al. ..................... 358/466 |
| 5,053,887 | 9/1991 | Thompson . |
| 5,111,310 | 5/1992 | Parker et al. . |
| 5,124,803 | 6/1992 | Troxel . |

FOREIGN PATENT DOCUMENTS

| | | |
|---|---|---|
| 454273A2 | 10/1991 | European Pat. Off. . |
| 454274A2 | 10/1991 | European Pat. Off. . |
| 454275A2 | 10/1991 | European Pat. Off. . |
| 454276A2 | 10/1991 | European Pat. Off. . |
| 454277A2 | 10/1991 | European Pat. Off. . |
| 90/06033 | 5/1990 | PCT Int'l Appl. . |
| 2169171A | 7/1986 | United Kingdom . |
| 0441609A3 | 8/1991 | United Kingdom . |

OTHER PUBLICATIONS

Digital Halftones by Dot Diffusion Donald E. Knuth, ACM Transactions on Graphics 1987.

Primary Examiner—Edward L. Coles, Sr.
Assistant Examiner—Scott A. Rogers
Attorney, Agent, or Firm—Allan Jacobson

[57] ABSTRACT

Internal moire artifacts found in digital halftoning of photographic images are diffused by rearranging the order of grayscale levels in an original screen pattern cell to generate a new screen pattern cell having a different grayscale order of stored screen pattern pixels. The grayscale order of the original cell is modified by the addition of a bump function at each point in the original cell in order of grayscale. The new grayscale order is stored in the new cell. Adding the bump function at the chosen point in the original cell influences the choice of the next pixel in the grayscale so that the grayscale order in the new cell is, in general, somewhat different from the grayscale order in the original cell. Errors caused by internal moire effects are thus both diffused in the grayscale dimension, and also diffused isotropically in the spatial dimension. The effect of rearranging the order of the grayscale levels in the screen pattern cell is to diffuse the internal moire artifacts in the final halftone to nearby pixels, thereby rendering the internal moire artifacts less noticeable.

24 Claims, 7 Drawing Sheets

METHOD AND APPARATUS FOR HALFTONING OF IMAGES USING GRAYSCALE ERROR DIFFUSION

FIELD OF THE INVENTION

The present invention relates to the field of image processing, and more particularly, the present invention relates to the halftoning of photographic images using improved screen patterns.

BACKGROUND OF THE INVENTION

Images are typically stored in a memory by representing tone values for each pixel of the original image. For a black and white image, the stored pixels represent the grayscale value corresponding to each pixel. For a color image, each color plane is stored as an array of pixels each representing the tone value for each pixel of the image in each respective color plane. For example, if each of the pixels of a black and white image is represented by an 8 bit digital word, then the tone value for a given image pixel may be one of 256 values between the black level and the white level.

Continuous tone images do not print well o most printing devices where typically the absence or presence of the ink on the paper is used to represent the printed image. In order to represent halftones (shades between the presence or absence of the printed ink), the original image is screened to produce a pattern, such as a variable size dots which appear to the human eye as a halftone image.

To prepare a photograph for printing, it is first necessary to perform the step of halftone screening, which converts the continuous gray shades of the original into dots of varying size and shape. Typically, these dots are arranged on a regular grid of approximately 100 dots per inch. This spatial frequency is known as the screen ruling. Thus, one square inch of the final printed photograph will be composed of approximately 10,000 dots.

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to herein as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark is generated by the marking engine, whereas if the value of the image pixel is less or equal to the screen cell value, then no mark is generated by the marking engine, or vice versa. In this way, the final screened image, composed of dots, is produced. In color printing, there are four separate steps of halftone screening, one each for the cyan, magenta, yellow, and black inks.

Much prior art work has been devoted to producing screens which will produce good results and avoid artifacts in the final image. One such artifact to be avoided is the moire pattern which results from the interaction between the original image and the screen pattern. To counteract the tendency for moire patterns to result, color screens are angled at 0 (yellow), 15 (cyan), 75 (magenta) and 45 degrees (black). If these angles are adhered to precisely, as well as the screen ruling being precisely identical for all four planes, then optimum results (minimum moire) are achieved. Screening at these angles presents no special problem in photomechanical screening systems (achieved by simply rotating the photographic screen carrier). In digital screening devices and digital raster scan imaging devices there is some difficulty reproducing irrational numbers, such as the tangent 15 or tangent 75 degrees. Rational numbers can be represented as the ratio of two integers; irrational numbers are endless non-repeating decimals. Both rational tangent and irrational tangent digital screening systems are known.

In particular, many screening methods make use of a screen pattern cell, which can be a one dimensional strip, a band, or any two dimensional area, such as a square, that contains a section of the final screen The screening method will repeatedly generate the screen pattern cell, resulting in a final screen of the desired ruling and angle. The critical step in halftone screening is the generation of the screen pattern cell which will be repeated to form the final screen covering the entire input image area. Examples of prior art techniques include rational tangent (U.S. Pat. No. 4,149,194 to Holladay), rational supercell (European patent document 0 427 380 A2), irrational tangent (U.S. Pat. Nos. 4,499,489 to Gall et al, and 4,350,996 to Rosenfeld). In addition, three alternative screening techniques described in three copending patent applications by the inventor of the present invention, Ser. No. 753,893, filed Sep. 3, 1991, Ser. No. 768,135, filed Sep. 27, 1991, and Ser. No. 805,278, filed Dec. 10, 1991 may each be used to generate a suitable screen pattern cell.

SUMMARY OF THE INVENTION

As indicated, objectionable moire patterns result from the interaction of the original image and the screen, which could be called external moire. However, in digital raster scan screening systems, there is another source of artifacts, which could be termed internal moire, which results from the interaction between the screen and the finite resolution of the output image forming device. Internal moire occurs only in digital raster scan screening systems, whereas external moire occurs in all screening systems, including photomechanical. Internal moire artifacts are particularly objectionable when using fine screen rulings, low output resolutions, or a combination of both. As a result, it is typical to use a 3500 dot per inch (dpi) output resolution to minimize internal moire artifacts and obtain a quality image.

However, a 3500 dpi printer system has both cost and speed disadvantages as compared to a 1270 dpi printer. The present invention is directed towards reducing internal moire artifacts, thereby permitting a faster, less expensive digital screening system to produce high quality halftone images.

A first screen pattern cell is created by any suitable prior art technique. Whatever first screen pattern cell is chosen, it will contain screen pattern pixel values arranged in some first grayscale order between lightest to darkest. That is, one screen pixel will be the lightest pixel in the cell, another pixel will be the second lightest, and so on. It is possible that two pixels will be exactly the same gray shade, but because pixels in the cell are calculated with trigonometric functions (for angled irrational screens) and 24 bit arithmetic for example, it would be the exception rather than the rule for two pixels to have equal gray shade values. If, by some rare chance two pixels do have the same gray shade, then the first one encountered is assigned the next place in the grayscale order.

Then, in accordance with the present invention, a second screen pattern cell is created from the first screen pattern cell by rearranging the order of grayscale levels of said stored first screen pattern pixels of said stored first screen pattern cell to generate the second screen pattern cell having a second grayscale order of stored screen pattern pixels.

The effect of rearranging the order of the grayscale levels in the screen pattern cell is to diffuse the internal moire artifacts in the final halftone to nearby pixels, thereby rendering the internal moire less noticeable. Also, since errors are diffused in the grayscale dimension (rather than along the raster scan spatial dimension), spatial artifacts are diffused equally in all directions, i.e. isotropically.

To effect a rearranging of the grayscale levels in the screen pattern cell, the following process in carried out:

1. A reference cell is initially set equal to the original old screen pattern cell. A separate new cell is reset to an initial state.

2. The location of the lightest screen pattern pixel (i.e. white) in the reference cell is identified, and the corresponding pixel in the new cell is marked as the first gray shade in the new cell.

3. A bump function, such as a Gaussian bell-shaped curve, is added to the chosen pixel in the reference cell, which has the effect of increasing (darkening) the chosen pixel and the nearby pixels. Typically the bump function covers several halftone dots.

4. The next darker screen pattern pixel in the reference cell is identified, and the corresponding pixel in the new cell is marked as the second gray shade in the new cell.

5. The bump function is again added to the reference cell at the newly chosen pixel.

6. The next darker screen pattern pixel in the reference cell in identified, and so on until all the pixels have been identified in grayscale order from the lightest to the darkest.

7. The reference cell is discarded and the new cell used to screen the input image.

Adding the bump function at the chosen point in the reference cell influences the choice of the next pixel so that the grayscale order in the new cell is, in general, somewhat different from the grayscale order in the old cell. The grayscale order in the reference cell, on the other hand, remains the same after the bump function has been added to all pixels in the cell. Because the new cell is assigned values in uniform grayscale increments, the new cell has a normalized distribution of grayscale values, even if the old cell was not normalized. The present invention can be used with screen pattern cells produced by a variety of different screening techniques, including rational supercells (Schiller), irrational cells (Gall et al), and alternative screen pattern cells. It is expected that the present invention will be applicable to other screening techniques as well.

DESCRIPTION OF THE FIGURES

FIG. 3b shows the screen pattern cell, in this case a rational supercell processed in accordance with the present invention, and used to make the halftone of FIG. 3a.

DETAILED DESCRIPTION

Figure 1:
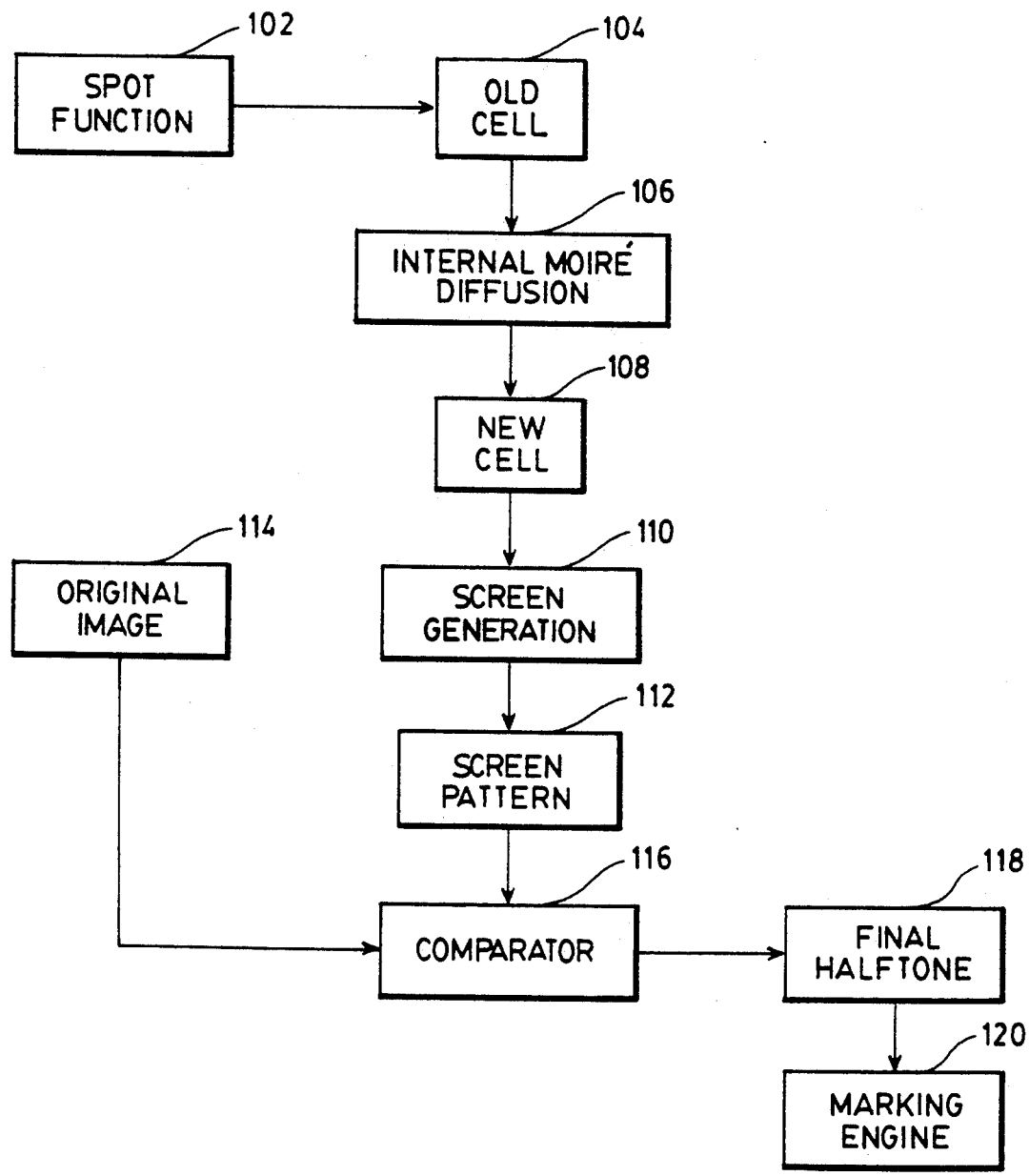
FIG. 1 is a block diagram of a system for halftone screening of images using internal moire error diffusion in accordance with the present invention.

The artifacts produced by internal moire, and the manner in which the present invention diffuses such artifacts, may be understood by considering a simple case where a section of the input image is a solid shade of gray. Internal moire can be seen most clearly when the original image contains little or no fine detail, for example smooth gradations and solid blocks of tone. Internal moire also appears in images with much detail, but is not as clearly visible, because it is masked by the image detail (and perhaps external moire as well).

Assume that the original image is a constant 20% of grayscale, and one counts the number of pixels that are marked in every dot appearing in the final halftone. Ideally, for a uniform shade of gray, the number of pixels marked in each dot should be equal. If the output resolution is 1270 dpi, and the screen ruling is 133 lines per inch, each dot would ideally be 18.24 darkened pixels. In a digitally produced halftone, however, the dots in the final halftone can consist only of an integral number of pixels. Using a prior art screen pattern cell, with the original grayscale order of stored screen pattern pixels, the final halftone will have dots with 16, 17, 18, 19, and 20 pixels. Further, the varying dot sizes will tend to cluster in well defined regions, making the variation more objectionable to the eye.

Using the screen pattern cell produced by the present invention, the final halftone will have dots almost entirely of 18 and 19 pixels, resulting in a higher quality halftone. In addition, the pattern of 19 pixel dots versus 18 pixel dots will be dispersed or diffused. Specifically, most 19 pixel dots will be surrounded by 18 pixel dots, to the greatest extent possible. Large clusters of 18 pixel dots or clusters of 19 pixel dots will not be present in the final halftone.

As indicated, starting with grayscale order in the original prior art cell, the bump function is added to each successive pixel thereby darkening the nearby pixels in the pattern. The bump function has a center maximum with decreasing values at all distances from the center. Therefore, it is most likely that the next chosen pixel (next in order of grayscale) will not be near, i.e. will be some distance away from the present chosen pixel. As a result, each halftone cell (dot) in the screen pattern cell is chosen in succession, causing an even distribution of pixels as the dots in the screen pattern cell grow in size along the grayscale from lightest to darkest. The grayscale values in the new cell can thus be characterized by the fact that small grayscale increments are distant, i.e. spatially separated. In prior art cells, small grayscale increments have an equal chance of being near or distant.

Counting the number of darkened pixels in each dot is not meaningful when the dots are not individually distinguishable, for example, exactly at the 50% gray with a conventional square dot shape, or with gray values between 40% and 60% using an elliptical shape, or with any gray value in a straight line screen. The process of the present invention, however, because it is based on a novel isotropic error diffusion technique, will produce halftones of greatly increased quality under all conditions.

Internal moire can also be understood in terms of sampling theory. In a typical prior art halftone, each pixel is the result of a comparison between the original image and the spot function. One comparison occurs for each output pixel. The final halftone image can be regarded as a sampling of an ideal halftone at which the comparisons are performed at all points in the image plane, i.e. infinite resolution. The sampling frequency is equivalent to the spatial resolution of the output device. Prior art photomechanical systems do not have a similar problem because the spatial resolution of the output device is equivalent to the much finer resolution of the film grain.

According to sampling theory, only spatial frequencies up to the Nyquist frequency, which is half the sampling frequency, are accurately encoded in the sampled image (i.e. the actual halftone presented to the output device). All spatial frequencies contained in the ideal halftone that fall above the Nyquist frequency are aliased, which is to say that they appear in the final halftone as artifacts. The spatial frequencies of these unwanted artifacts are always below the Nyquist frequency.

In most signal processing applications, such as audio, it is possible to remove the aliasing by using a low-pass filter. In halftone screening, however, low-pass filtering is not practical, because the halftone pixels are constrained to be either on or off, not shades in between. At any given point in the process of the present invention, the reference cell contains the sum of the old cell and a lowpass filtered version of the error arising from previous pixel choices. The lowpass filtered version of the error is substantially the same as the artifacts in the corresponding final halftone.

Suppose, for example, that the choices of pixels so far have led to an area in the final halftone which is slightly darker than the average. The lowpass filtered error will thus be greater in that area than in other areas. Since the addition of the bump function darkens the area around the present pixel, the next pixel chosen will be in an area other than the overly dark area. Thus, successive pixel choices will counteract the error from previous pixel choices. As a result of this error diffusion process, substantial artifacts are not allowed to form.

The spatial frequency content of the ideal halftone is qualitatively similar to that of a square wave or pulse wave. Quantitatively, the artifact level in the final halftone is proportional to the reciprocal of the square of the screening ratio. The screening ratio is the output resolution divided by the screen ruling. For example, if the output resolution is 1270 dpi, and the screen ruling is 133 lines per inch, then the screening ratio is 9.549, and the internal moire artifacts are about ±0.011 of the entire tone range.

A system for making a halftone is shown in FIG. 1 where a spot function 102 is used to create an "old" cell 104, which is used in turn as the input to an internal moire diffusion process 106. The result of the internal moire process 106 is new cell 108, which in turn is used by screen generation process 110 to produce screen pattern 112. Original image 114 is compared against screen pattern 112 by comparator 116, producing final halftone 118. Final halftone 118 is conveyed to marking engine 120, which records the final halftone as an image on film or paper or some other imaging carrier.

Figure 2:
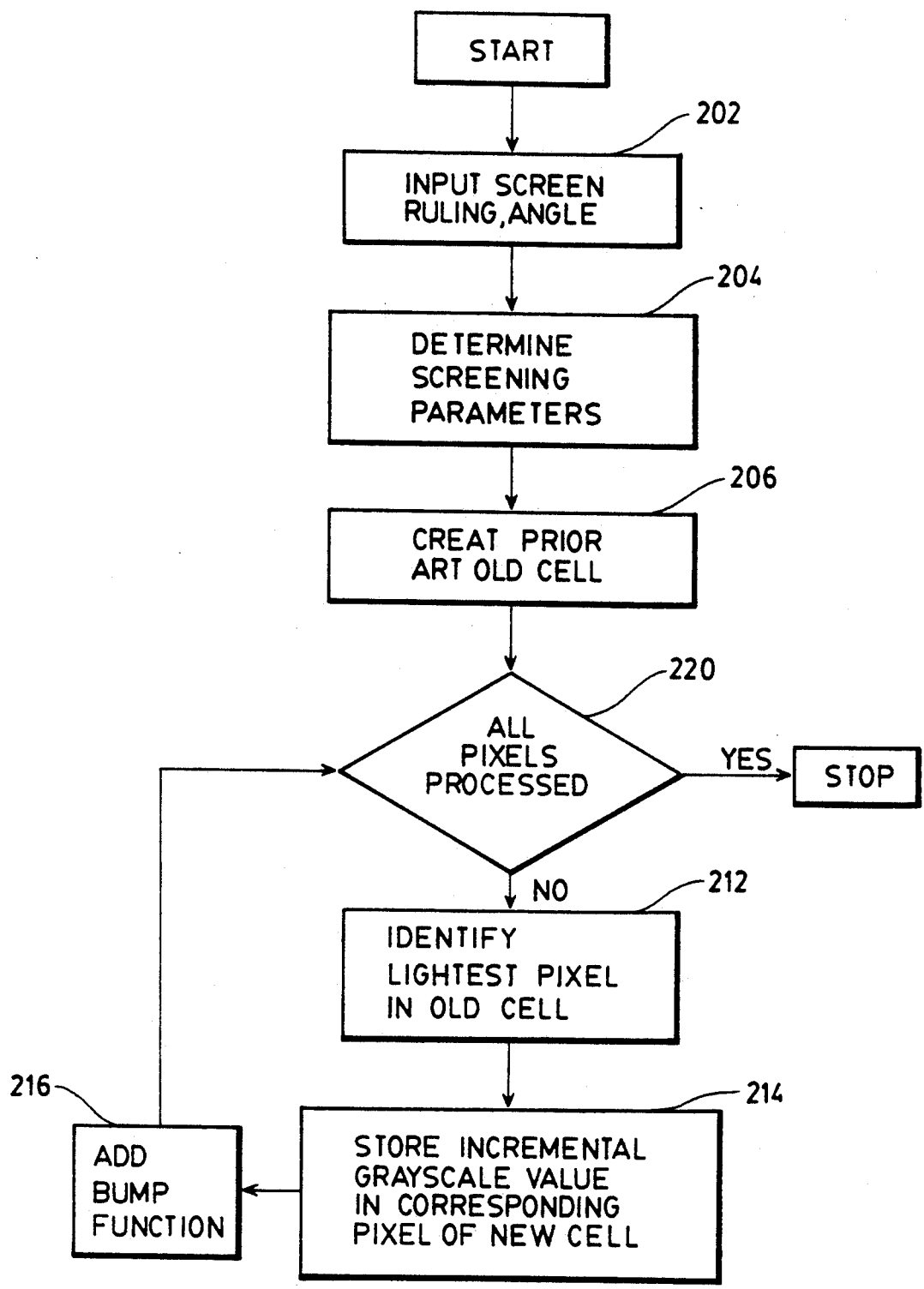
FIG. 2 is a flow chart illustrating the method for generating a new screen pattern cell from a prior art screen pattern cell in accordance with the present invention.

A flow chart illustrating the process for generating a new cell from an old cell is shown in FIG. 2. First, the desired screen ruling and angle are input in step 202. Then, the screening parameters are determined in step 204. The nature of screening parameters depends on the screening technique used. For example, in rational supercell screening (Schiller), the screening parameters include the width and height of the cell, as well as the horizontal shift of each successive row of cells. In copending patent application Ser. No. 753,893, filed Sep. 3, 1991, the screening parameters include the width and height of the cell, as well as the jt, ut, and vt tables used for error vector calculations. A different screen pattern cell would be created for each combination of screen ruling and angle.

Thereafter, the prior art screen pattern cell is created in step 206 as the old cell using a suitable spot function, and provided to an internal moire diffusion process, to create a new cell. To create a new cell, the lightest pixel in the old cell is identified in step 212. The incremental grayscale value is stored in the corresponding pixel in the new cell. A bump function is then added to the reference cell at the chosen (lightest) pixel. The process continues sequencing up the grayscale excluding previously chosen pixels, until all pixels in the old screen pattern cell have been processed at step 220. Steps 212, 214, 216 and 218 for creating the new cell from the old cell are further detailed in FIG. 6.

Figure 3A:
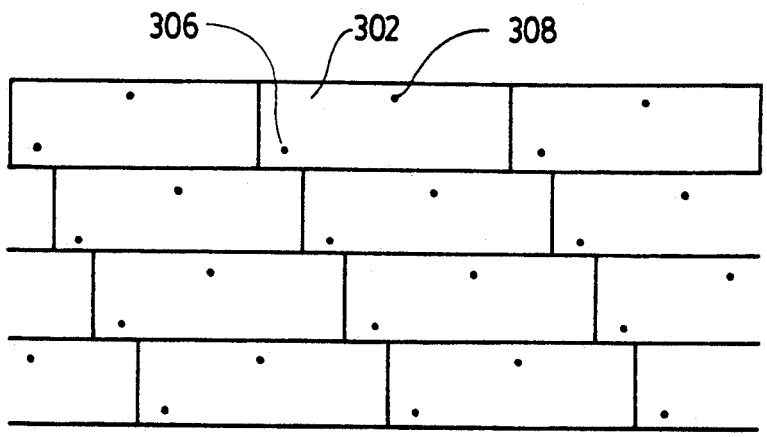
FIG. 3a illustrates a gray shade halftone second incremental gray shade.
Figure 3B:
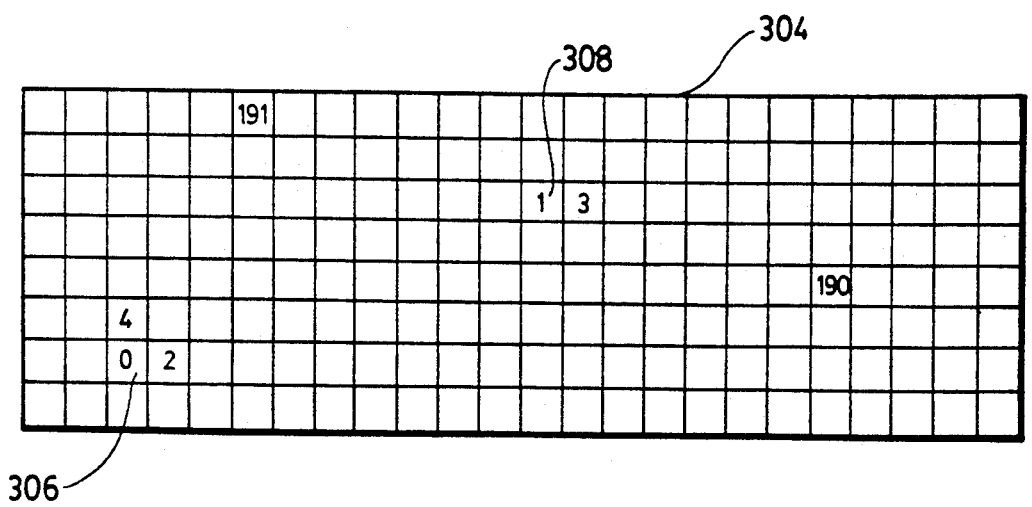

FIGS. 3a and 3b illustrates the use of the present invention in a rational supercell, i.e. a screen pattern cell containing a section of a final screen with a plurality of whole or fractional halftone dots at a prescribed angle and screen ruling, and repeated with rows offset to tile a complete halftone screen. For rational tangent angles, the halftone dots in the screen pattern substantially match up to form a continuous halftone dot pattern.

Halftone 302 is a solid shade of gray consisting of consisting of the repetition of a halftone cell with two black pixels 306 and 308, which shade corresponds the second increment along the grayscale. FIG. 3b shows the screen pattern cell 304 (which is, in this case, a 24×8 cell of 192 pixels) used to generate halftone 302. The lightest pixel, 0, corresponds to pixel 306 in the halftone. The next lightest pixel, 1, corresponds to the pixel 308 in the halftone.

The screen pattern cell 304 in FIG. 3b illustrates a typical order of grayscale resulting from the use of the present invention. After pixel 1, it is noted that the next pixel 2 (next along the grayscale) is near (near in the spatial dimension) to pixel 0, while next pixel 3 is near to pixel 1. Similarly, next pixel 4 is near to pixel 0. The alternation of pixels in grayscale order between the halftone dots centered at pixels 306 and 308 results in more uniform dot formation as the input shade varies along the grayscale. The darkest pixel 191 and next darkest pixel 190 are also uniformly placed in the spatial dimension. The order in which pixels are chosen in the new cell is equivalent to the order in which pixels are darkened in the final halftone as the input image goes from lightest to darkest. The exact order of the choices of pixels determines the dot shapes of the various shades of gray, as well as the presence or absence of artifacts.

ERROR DIFFUSION

Figure 4A:
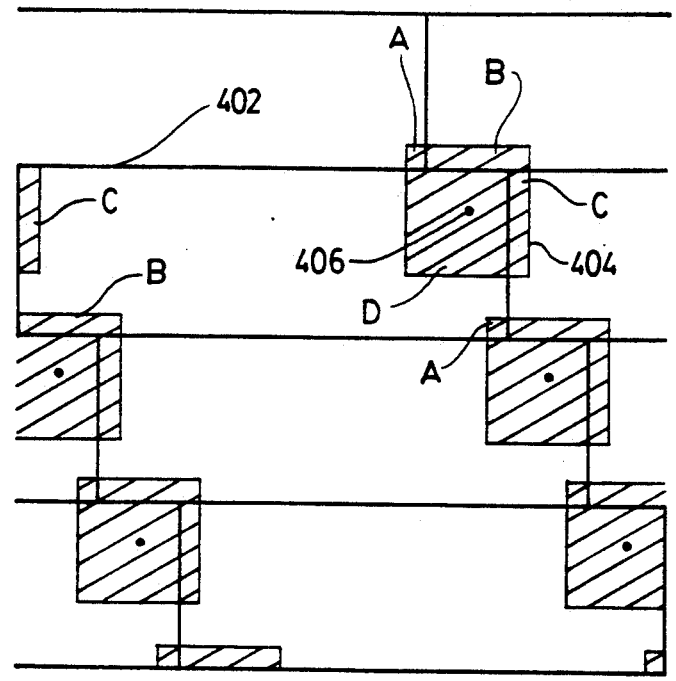
FIG. 4a shows a section of a screen, for use with a rational supercell, in which a bump function is superimposed and centered upon each chosen pixel in the cell in accordance with the present invention.

The error diffusion step used in the present invention consists of adding a bump function, centered upon the chosen pixel, to the reference cell. The bump function is typically represented as a 61×61 square matrix. FIG. 4a shows that a square area 404 where the bump function will be added is centered on pixel 406 in the halftone 402. If the square area 404, positioned so that its center coincides with the chosen pixel 406, were to fall entirely within the cell, then it could be added to the cell unambiguously. However, as shown, the square area 404 falls partially outside the halftone cell 402, and a decision must be made on how to account for the portions A, B and C that fall outside the cell and overlap the neighboring halftone cells. The portion D of square area 404 which falls inside halftone cell 402 can be simply added to the contents of the reference cell.

Figure 4B:
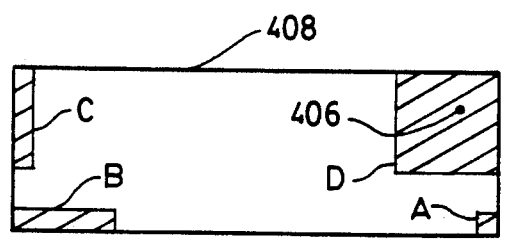
FIG. 4b illustrates a screen pattern cell, and the manner in which a bump function is added to the cell in accordance with the present invention.

One alternative is simply to discard portions A, B and C not contained within the cell. However, the latter alternative does not lead to the highest quality, and it potentially allows artifacts to accumulate near the edges of the cell. Therefore, it is preferable to wrap around areas A, B and C so that the effect of adding the bump function takes into account areas extending into the neighboring cells. FIG. 4b illustrates how the bump function centered at pixel 406, is added to the screen pattern cell 408. Area D is added directly. Area C wraps around to the opposite side of screen pattern 408, and areas A and B wrap around to the opposite side of screen pattern 408 with suitable offsets to compensate for the shift between adjacent rows of the supertile making up the complete halftone screen.

Figure 5:
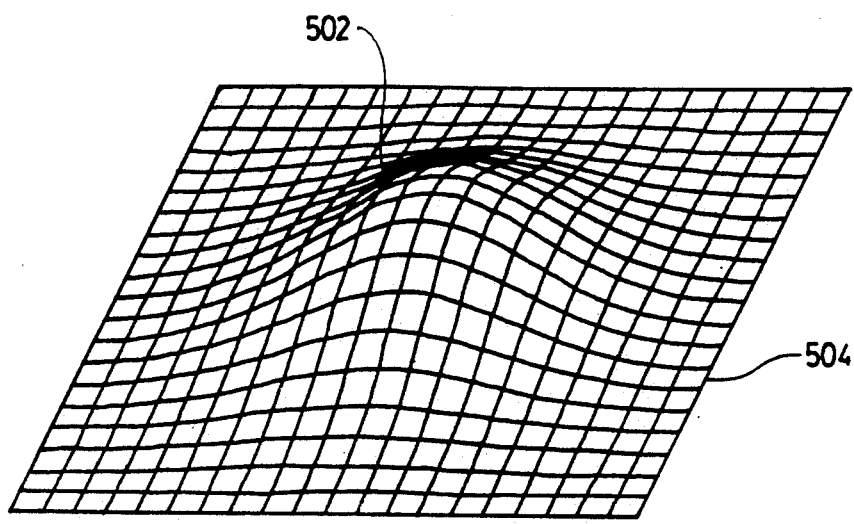
FIG. 5 illustrates the bump function as a three dimensional plot, used in conjunction with the present invention.
Figure 7:
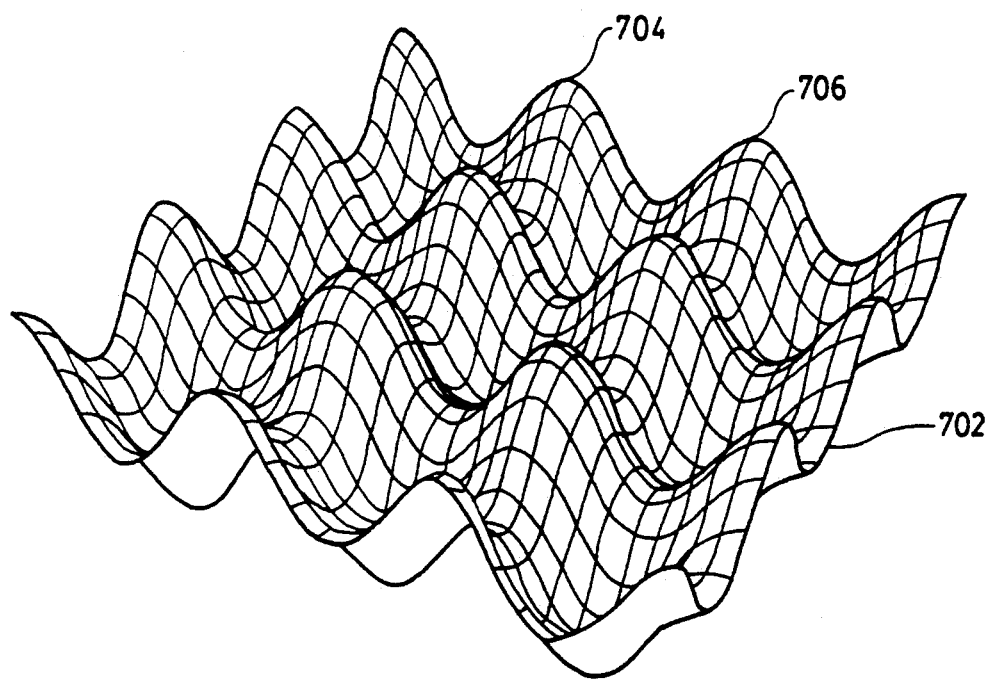
FIG. 7 shows a three dimensional plot of a halftone screen containing several halftone dots, which may be used in conjunction with the present invention.

FIG. 5 is an isometric view of the bump function 504 with a maximum value or peak value 502. A typical maximum 502 may be 20% of grayscale. FIG. 7 is an isometric view of a halftone screen 702 containing several halftone dots. The height of the surface shown represents the grayscale value of the screen pixels. For example, peak values 704, 706 represent the darkest pixel values of the spot function in the halftone screen 702.

RATIONAL SUPERCELL SCREENS

In a rational supercell halftone of FIG. 4, the screen pattern consists of periodic repetitions of the cell. Therefore, any sections of the square area 404 falling outside the cell 408 would fall unambiguously within an adjoining cells. Therefore, the preferred method is to add the portions of the square matrix that fall outside the cell to the regions corresponding to those regions in adjoining cells in the screen pattern.

The relation between adjoining regions can be expressed mathematically, as follows. If one begins at point (x, y) in a cell in the screen pattern, and moves dx pixels to the right and dy pixels down, then one will arrive at the point (x1, y1) in a cell, perhaps within the same cell, perhaps a different cell.

The method for determination of the x1 and y1 depends on the exact nature of the rational supercell. Here, it is given for a supercell constructed according to Holladay. Assume that the width of the cell is w, and the height is h. Also assume that the horizontal shift from one row of cells to the next is s. Then, $$x1 = (x + dx + (((y \bmod h) + dy) \operatorname{div} h) \cdot s) \bmod w$$

and $$y1 = (y + dy) \bmod h$$

Here, div represents integer division, i.e. truncating the fractional part.

Here is pseudocode representing the algorithm for rational supercells:

```
set all values of reference cell to old cell
g=0
for i=1 to w·h
  choose x,y pixel with minimum reference[x,y] value
    set new[x,y]=g
    for dy=-30 to 30
      for dx=-30 to 30
        calculate x1, y1 from x, y, dx, dy
        reference[x1,y1]=reference[x1,y1]-
          +bump(dx,dy)
      next
    next
    g=g+1/(w·h)
next
``` where:
bump(dx,dy) is the square matrix representing the error diffusion bump function, and is described in the next section
dx and dy iterate over all values of the square matrix representing the bump function.
g is the grayscale value to be assigned to the chosen pixel in the new cell
h is the height of the cell
i counts the number of iterations of the main loop
new[x,y] represents the new cell
reference[x,y] represents the reference cell
w is the width of the cell
x and y are the coordinates of the chosen pixel
x1 and y1 are the coordinates at which the bump function is to be added to the reference cell The step of choosing an x,y pixel with a minimum reference[x,y] value must exclude any x,y pixel that has been previously chosen.

THE BUMP FUNCTION

The present invention makes use of a bump function to perform the error diffusion step. Typically, this bump function is a two-dimensional Gaussian bell function, and is thus mathematically determined by the equation:

$$\text{bump}(dx,dy) = eg \cdot e^{-am \cdot (dx^2 + dy^2)},$$

where am and eg are parameters that determine the extent and height, respectively of the bump function. Experiment has determined that optimum values for eg and am can be determined as follows:

$$am = \frac{1}{sr^2} \quad eg = \frac{2}{sr}$$

where sr is the screening ratio. Therefore, for the previous example of a 133 line screen halftone on a 1270 dpi resolution device, the screening ratio is 9.549, and optimum values are am=0.011, and eg=0.21.

The two-dimensional Gaussian bell function is radially symmetrical, which is to say that is not changed by a rotation about the origin. Therefore, the error diffusion process used in the present invention is isotropic, which is to say the same in all directions. No one dimension is preferred. Known prior art error diffusion techniques are anisotropic, which is to say that some directions are preferred above others. Specifically, error can not be propagated upward, in other words contrary to the secondary scanning direction, because all pixels above the present scan line have already been determined, and cannot be changed, as a result of processing the image in raster scan order. The error diffusion process of the present invention iterates through grayscale values, rather than in raster scan order, and is thus capable of using an isotropic error distribution, such as the two-dimensional Gaussian bell function.

Other functions than the two-dimensional Gaussian bell can be used, as can other values for the parameters than those recommended here. However, the recommendations in this section have been determined by experiment to be optimum.

IRRATIONAL ANGLED SCREENS

The present invention can also be practiced in conjunction with irrational angled screens such as can be generated by Gall et al and also by the alternative screening techniques, cited above. However, adding a bump function to an irrational angled screen, when the bump function falls outside the screen pattern cell, is more complex than adding a bump function to a rational angled screen under the same conditions. The reason for the added complexity is that the screen values in adjacent cells used to determine wrap around values are not deterministic in an irrational angled screen, but occur with appear with some relative probability. In such case, the bump function is distributed to each of the possible pixels values in accordance with the relative probability of occurrence of that particular pixel value. The following treatment is presented in a general fashion, so that it will work with all screening methods that share the important basic properties.

In the final screen pattern of irrational angled screens, as in rational angled screens, a specific pixel in the cell, say (x,y), is repeated many times in the final screen pattern. However, because irrational screens cannot be formed from exact periodic repetitions of the cell, if one were to move (dx,dy) pixels relative to any of these occurrences, one would not always find the same (x1,y1) cell pixel. Rather, if one starts at one specific point in the final screen pattern occupied by cell pixel (x,y), and moves (dx,dy) pixels relative to that occurrence, one will find one of several possible cell pixels (x1,y1). In the case of Gall et al, the number of possible (x1,y1) values is typically 4. In the alternative screening methods cited above, the number of possible (x1,y1) values is typically less than 16.

The main loop of the present invention is modified so as to distribute some portion of the error (i.e. bump function) to each of the (x1,y1) pixels. The exact portion is based on the relative probability of occurrence of that particular (x1,y1) found at offset (dx,dy) to the original pixel (x,y).

The relative probability of finding pixel (x1,y1) at an offset (dx,dy) from (x,y) is denoted as p(x,y, dx,dy, x1,y1). The function p can be calculated as follows: scan through the entire final screen pattern, and count the number of occurrences of screen pixel (x,y). Also, for each point in the final halftone in which screen pixel (x,y) is found, compare the point offset by (dx,dy) to determine if it is occupied by screen pixel (x1,y1), and count the number of occurrences. The ratio of the latter divided by the former is equal to the value of p(x,y, dx,dy, x1,y1).

To distribute the error, we will actually use the value of p(x1,y1, −dx,−dy, x,y). For screening methods (such as Gall et al) in which all cell pixels have an equal frequency of occurrence in the final halftone, this quantity is equal to p(x,y, dx,dy, x1,y1). However, in the alternative screening methods, where not all screen pixels have equal frequency of occurrence, the use of the former rather than the latter probability value prevents excessive error from accumulating in relatively more frequent screen pixels. Excessive error accumulation is prevented due to the property of p that, for all values of x1, y1, dx, and dy:

$$1 = \sum_{\text{all } x} \sum_{\text{all } y} p(x1,y1,-dx,-dy,x,y)$$

Thus, after running all iterations of the main loop, each pixel in the reference cell has received an equal amount of error. In general, the exact values of p(x,y, dx,dy, x1,y1) depend on the screening technique, as well as the screen ruling and angle.

Here is pseudocode representing the most general algorithm for all types of irrational angled screens:

```
set all values of reference cell to old cell
g=0
for i=1 to w·h
   choose x,y pixel with minimum reference[x,y]
      value
   set new[x,y]=g
   for dy=−30 to 30
      for dx=−30 to 30
         find all x1, y1 combinations from x, y, dx, dy
         for each x1, y1 combination
            reference[x1,y1]=reference[x1,y1]+
            p(x1,y1, −dx,−dy, x,y)·bump(dx,dy)
      next
   next
   g=g+1/(w·h)
next
``` where:
- bump(dx,dy) is the square matrix representing the error diffusion bump function, and is described in the next section
- dx and dy iterate over all values of the square matrix representing the bump function.
- g is the grayscale value to be assigned to the chosen pixel in the new cell
- h is the height of the cell
- i counts the number of iterations of the main loop
- new[x,y] represents the new cell
- p(x,y, dx,dy, x1,y1) is the relative probability of finding screen pixel (x1,y1) at an offset of (dx,dy) from all occurrences of screen pixel (x,y) in the final screen pattern
- reference[x,y] represents the reference cell
- w is the width of the cell
- x and y are the coordinates of the chosen pixel
- x1 and y1 are the coordinates at which the bump function is to be added to the reference cell It is worth noting that the rational tangent version is a special case of the above treatment. In the rational supercell case, only one (x1,y1) value results from any combination of x, y, dx, and dy. Since there is only one possibility, its relative probability, p(x,y, dx,dy, x1,y1) is always unity. Thus, the above algorithm reduces to that presented for the rational supercell case.

It should also be noted that in the case of Gall et al, the nature of the screening method and its corresponding p() function will cause the bump function to be added in very fragmented form. Specifically, the bump function will be primarily added to screen pixels that will be nearby in the final screen pattern, rather than pixels that are nearby in the cell. In the alternative screening methods, the bump function will in general not be highly fragmented, since nearby pixels in the cell also tend to be nearby in the final screen pattern, especially if the height of the cell is comparable to the extent of the bump function.

Figure 8:
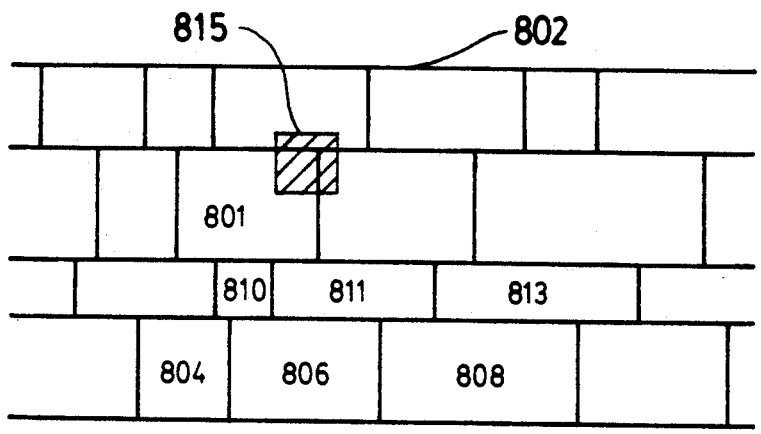
FIG. 8 shows a section of a screen, for use with a plurality of strips of an ideal irrational angled screen.

FIG. 8 shows a section of an irrational screen, assembled from a plurality of strips of an ideal angled screen as disclosed in copending Ser. No. 753,893, filed Sep. 3, 1991. Screen pattern cells 804, 806 and 808 represent different length strips of an ideal angled screen having a given height. Similarly, screen pattern cells 810, 811 and 813 represent shorter height, and different length strips of an ideal angled screen. A bump function represented by area 815 is to be added to a pixel in strip 801, which bump function overlaps the different height and different length strip 802 above. In general, different length and height strips appear in a number of different relative positions, creating the complexity in calculating wrap around bump function in terms of probabilities.

Figure 6:
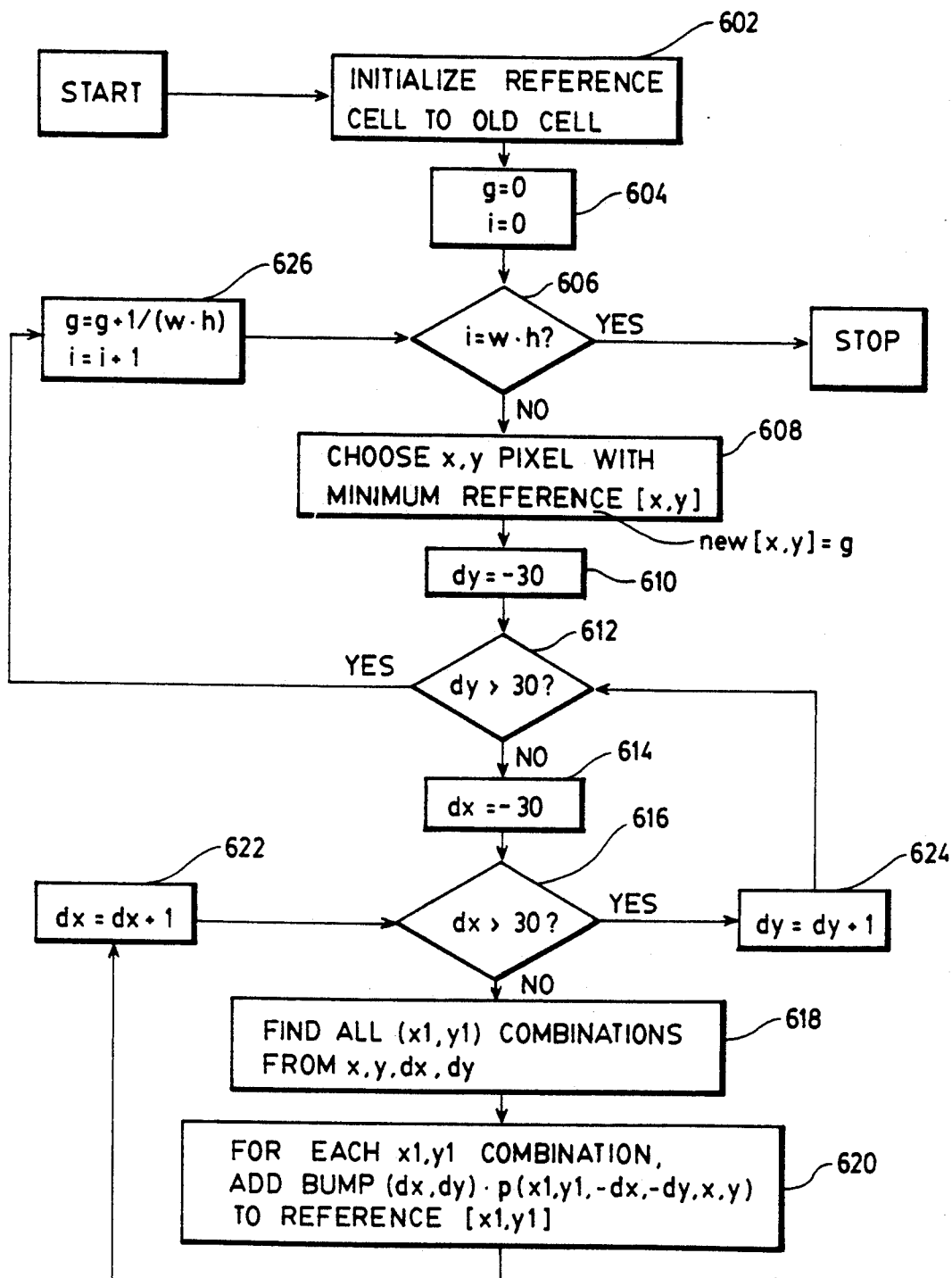
FIG. 6 shows a flowchart detailing an embodiment of the present invention as a software program running on a general purpose computer.

FIG. 6 shows a flowchart of the internal moire diffusion process, corresponding to steps 212, 214, 216 and 220 in FIG. 2. Processing begins with step 602, in which the contents of a reference cell are initialized to duplicate the contents of the old cell 104, which contains pixel values generated from a spot function. Then, in step 604, the variables g, representing the gray shade to be assigned the next chosen pixel, and i, an index variable for counting the number of iterations through main loop (consisting of steps 606 through 626) are both initialized to zero.

Upon every iteration of the main loop, step 606 checks to determine whether all iterations have been performed. If so, processing is complete. If not, processing continues with step 608, in which minimum pixel is chosen in the reference cell, and the coordinates of the chosen pixel are stored in the variables x and y. In addition, the corresponding chosen pixel in the new cell is set to the value of g. Step 608 excludes from consideration all pixels that have been chosen in previous iterations, thus ensuring that, upon completion, each pixel will have been chosen exactly once.

Steps 610, 612, 614, 616, 622, and 624 effectively iterate steps 618 and 620 over all combinations of values of dx and dy, each within a range from −30 to 30. In step 610, the variable dy is initialized to −30. In step 612, the value of dy is compared with 30, and if the former does not exceed the latter, processing continues with step 614, in which dx is initialized to −30. Step 616, correspondingly, compares the value of dx with 30, and if the former does not exceed the latter, continues with step 618.

In step 618, all combinations of (x1,y1) are determined from moving an offset (dx,dy) from an occurrence of screen pixel (x,y) in the screen pattern 112. Then, in step 620, for each such combination of (x1,y1), the quantity bump(dx,dy)·p(x1,y1, −dx, −dy, x,y) is added to the contents of the reference cell pixel addressed by the coordinates (x1,y1). Steps 618 and 620 add the bump function to the reference cell, with wrap around areas and relative probabilities of occurrence of pixel values in the wrap around areas taken into account.

After performing steps 618 and 620 for one combination of values of dx and dy, the next value of dx is determined in step 622. If, in step 616, it is then determined that dx does not exceed 30, then steps 618 through 622 are repeated until dx does in fact exceed 30. Then, the next value of dy is determined in step 624. If, in step 612, dy does not exceed 30, then steps 614 through 624 are repeated until dy does exceed 30. Processing then continues at step 626, at which point all combinations of dx and dy, each in the range of −30 to 30, will have been iterated. In step 626, the next incremental gray shade is determined, and stored in the variable g. In addition, the main loop counter i is incremented, and the main loop is repeated, beginning at step 606, until all iterations of the main loop have been performed, at which point processing is complete. The net result is a new screen pattern cell with having a grayscale order of stored screen pattern pixels different from the grayscale order of the old screen pattern cell.

SPEED IMPROVEMENTS

The foregoing algorithm is fairly simple to implement, and is general for use with a variety of screening techniques. A screen pattern cell, once created, may be used to screen any number of halftones. As long as the screening speed is adequate, the speed of creation of the screen pattern cell may be relatively slow. However, a variety of optional techniques to improve the calculation speed of the p(x,y, dx,dy, x1,y1) function is briefly described.

The first optimization is to store the values of the p() function in a look-up table. If the entire p() function were to be stored, the look-up table would be extremely large. Consequently, a simplifying assumption is made that the cell is repeated whole across the scan line. This assumption can be expressed mathematically as:

p(x,y, dx,dy, x1,y1)=p(0,y, 0,dy, (x1-x-dx) mod w,y1) where w is the width of the cell.

While the assumption might not be strictly true, it has been found not to significantly degrade the quality of the final halftone when adopted for the purpose of processing the cell according to the present invention, at least with the alternative screening methods, cited above.

Thus, it is sufficient to store, for every combination of y and dy, a list of xb,y1 values, and their relative probabilities p(0,y, 0,dy, xb,y1). The xb values stored are the x1 values assuming that x and dx are both zero. From the xb value, it is possible to determine x1 from the formula x1=(x+dx+xb) mod m. For the alternative type of screening methods, there are typically less than 16 possible (xb,y1) values for each combination of y and dy. The number of (xb,y1) values is stored as well. For example, if the height of the cell is 40, and if the range of values of dy is $-30 \ldots 30$ (for a total of 61 total values), then there are 2440 (40 times 61) total combinations. An array is constructed that contains the number of (xb,y1) values for each of the 2440 combinations. Then, a maximum of 39040 (2440 times 16) values for xb,y1 are stored in a separate array.

To construct the above tables, the (x,y) coordinates of the first cell pixel of each scan line of the final screen pattern are determined, then tabulated. In addition, because the p( ... ) values do not change with dx, it is possible to increase the speed by interchanging the order of the inner two loops. Thus, the revised pseudo-code:

```
determine tables as above
set all values of reference cell to old cell
g=0
for i=1 to w·h
    choose x,y pixel with minimum reference[x,y]
        value
    set new[x,y]=g
    for dy=-30 to 30
        retrieve the number of x1,y1 combinations
            from
        location y,dy in table
        for each combination
            retrieve xb,y1,p values from tables
            for dx=-30 to 30
                x1=(xb+x+dx) mod m
                reference [x1,y1]=
                reference[x1,y1]+p·bump(dx,dy)
            next
        next
    next
    g=g+1/(w·h)
next
``` where:
bump(dx,dy) is the square matrix representing the error diffusion bump, and is described in the next section
dx and dy iterate over all values of the square matrix representing the bump function.
g is the grayscale value to be assigned to the chosen pixel in the new cell
h is the height of the cell
i counts the number of iterations of the main loop
new[x,y] represents the new cell
p is the relative probability of finding screen pixel (x1,y1) at an offset of (dx,dy) from all occurrences of screen pixel (x,y) in the final screen pattern
reference[x,y] represents the reference cell
w is the width of the cell
x and y are the coordinates of the chosen pixel
xb is the relative x1 coordinate retrieved from the table
x1 and y1 are the coordinates at which the bump function is to be added to the reference cell Another potentially time consuming operation is the search for the (x,y) pixel with the minimum reference[x,y] value. A literal implementation would require time proportional to w·h for each iteration of the loop. The technique described in this section can help to improve the speed of this step.

Before the main loop begins, a table of pointers to the reference cell is constructed. Each pointer is numbered from 0 to w·h−1. The table of pointers is then sorted in order of the addressed values in the reference cell. Any well known efficient sorting algorithm, such as quicksort, may be used. Then, for iteration number i, the pointers numbered from i to i+1000 (or the end of the table, whichever comes first) are searched for the minimum addressed value in the reference cell. The minimum so determined almost always corresponds to the minimum in the entire reference cell. To update the table of pointers for the next iteration, the chosen pointer is replaced by the pointer numbered i in the table. Thus, every pointer will be chosen exactly once.

Yet another time consuming step is the evaluation of the bump function. Even if the bump function were to be stored in a lookup table, it would still be necessary to multiply by the value of p once per inner loop. The optimization described below eliminates both these steps, making use of the "separability" of the bump function, which is to say that $$eg \cdot e^{-am \cdot (x2+y2)} = eg \cdot e^{-am \cdot x2} \cdot e^{-am \cdot y2}.$$

Prior to the main loop, a two dimensional look up table is constructed, called "the separated bump function table," containing the values $$\frac{eg \cdot e^{-am \cdot dx2} \cdot z}{1024},$$

for all values of dx in the range $-30 \ldots 30$, and all values of z in the range $0 \ldots 1024$.

As described in above, eg and am are parameters to the bump function. Instead of storing merely p(x,y, dx,dy, x1,y1) in the tables, rather $$int(1024 \cdot e^{-am \cdot dy2} \cdot p(x,y,dx,dy,x1,y1))$$

is stored instead. The function int(x) denotes the largest integer that is still not greater than x, for any x, i.e. truncating the fractional part. Then, during operation of the main loop, a value from this new table would be read into the variable z, replacing the step in which the value from the old table was read into the variable p. Also, for each iteration of the inner loop, instead of computing the bump function and multiplying by p, it suffices to merely look up the value addressed by dx and z in the separated bump function table.

What is claimed is:

1. A method for generating a halftone screened image from an original image, said method comprising:
   storing a first screen pattern cell having a first grayscale order of stored screen pattern pixels;
   rearranging the order of grayscale levels of said stored first screen pattern pixels of said stored first screen pattern cell to generate a second screen pattern cell having a second grayscale order of stored screen pattern pixels;

forming a generated screen pattern from said second screen pattern cell; and screening said original image with said generated screen pattern to form said halftone screened image.

2. A method in accordance with claim 1, wherein said step of rearranging the order of grayscale levels of said stored first screen pattern pixels of said first screen pattern cell to generate a second screen pattern cell having a second grayscale order of stored screen pattern pixels comprises:

modifying said first screen pattern cell at each stored first screen pattern pixel by combining a function with said first screen pattern cell to alter the respective grayscale levels of pixels adjacent to said each stored first screen pattern pixel.

3. A method in accordance with claim 2, wherein said step of combining a function with said first screen pattern cell to alter the respective grayscale levels of pixels adjacent to said each stored first screen pattern pixel comprises combining a bump function with respective pixels in said first screen pattern cell.

4. A method in accordance with claim 3, wherein said bump function is substantially a Gaussian shaped distribution function.

5. A method in accordance with claim 3, wherein said step of combining said bump function with respective pixels of said first screen pattern cell comprises adding said bump function to respective pixels of said first screen pattern cell.

6. A method in accordance with claim 2, wherein the step of rearranging the order of grayscale levels of said stored first screen pattern pixels of said stored first screen pattern cell to generate said second screen pattern cell having a second grayscale order of stored screen pattern pixels further comprises:

selecting each of said screen pattern pixels in said first screen pattern cell in grayscale order after combining said function with each respective said screen pattern pixels of said first screen pattern cell; and assigning the order of grayscale level of each said stored screen pattern pixels in said second screen pattern cell in the same order as said grayscale order of said modified first screen pattern cell after combining said function with each said screen pattern pixel of said first screen pattern cell.

7. A method in accordance with claim 2, wherein the step of combining said function with said first screen pattern cell to alter the respective grayscale levels of pixels adjacent to said each stored first screen pattern pixel includes wrapping around portions of said function in areas located outside of said first screen pattern cell, to modify respective screen pattern pixels inside of said first screen pattern cell.

8. A method in accordance with claim 2, wherein the step of combining said function with said first screen pattern cell to alter the respective grayscale levels of pixels adjacent to said each stored first screen pattern pixel includes wrapping around portions of said function in areas located outside of said first screen pattern cell to modify respective screen pattern pixels in proportion to the respective probability that each portion of said function located in areas outside of said first screen pattern cell corresponds to a pixel located inside of said first screen pattern cell.

9. A method in accordance with claim 1, wherein said step of rearranging the order of grayscale levels of said stored first screen pattern pixels of said stored first screen pattern cell to generate a second screen pattern cell having a second grayscale order of stored screen pattern pixels comprises:

a) setting a reference cell equal to said first screen pattern cell;

b) setting a new cell to an initial reset state;

c) selecting the lightest pixel in said reference cell and marking the corresponding pixel in said new cell as the first gray shade in the grayscale order of said new cell;

d) adding a bump function to the chosen pixel in said reference cell, said bump function darkening the chosen pixel and nearby pixels in said reference cell;

e) selecting the next darker pixel in said reference cell excluding previously selected pixels, and marking the corresponding pixel in said new cell as the second gray shade in the grayscale order of said new cell;

f) adding said bump function to said selected next darker pixel in said reference cell, said bump function darkening said next darker pixel and nearby pixels in said reference cell;

g) repeating steps e) and f) until all pixels in said reference cell have been selected in grayscale order from the lightest to the darkest; and h) using said new cell as said second screen pattern cell.

10. A method in accordance with claim 2, wherein the step of combining said function with said first screen pattern cell to alter the respective grayscale levels of pixels adjacent to said each stored first screen pattern pixel includes, for each of a plurality of second screen pattern pixels, using the value of said function applied to an offset of said second screen pattern pixel relative to said each stored first screen pattern pixel in said generated screen pattern.

11. A method in accordance with claim 10, including using portions of said function applied to a plurality of offsets of said screen pattern pixel relative to said each stored first screen pattern pixel, said portions being proportional to relative probabilities of said offsets in said generated screen pattern.

12. A method in accordance with claim 11, wherein a portion of said function is used for each of said plurality of offsets, said portion being proportional to the relative probability of said offset occurring in said generated screen pattern.

13. An apparatus for generating a halftone screened image from an original image, said apparatus comprising:

means for storing a first screen pattern cell having a first grayscale order of stored screen pattern pixels;

means for rearranging the order of grayscale levels of said stored first screen pattern pixels of said stored first screen pattern cell to generate a second screen pattern cell having a second grayscale order of stored screen pattern pixels;

means for forming a generated screen pattern from said second screen pattern cell; and means for screening said original image with said generated screen pattern to form said halftone screened image.

14. An apparatus in accordance with claim 13, wherein said means for rearranging the order of grayscale levels of said stored first screen pattern pixels of said stored first screen pattern cell to generate a second screen pattern cell having a second grayscale order of stored screen pattern pixels comprises:

means for modifying said first screen pattern cell at each stored first screen pattern pixel by combining a function with said first screen pattern cell to alter the respective grayscale levels of pixels adjacent to said each stored first screen pattern pixel.

15. An apparatus in accordance with claim 14, wherein said means for combining a function with said first screen pattern cell to alter the respective grayscale levels of pixels adjacent to said each stored first screen pattern pixel comprises means for combining a bump function with respective pixels in said first screen pattern cell.

16. An apparatus in accordance with claim 15, wherein said bump function is substantially a Gaussian shaped distribution function.

17. An apparatus in accordance with claim 15, wherein said means for combining said bump function with respective pixels of said first screen pattern cell comprises adding said bump function to respective pixels of said first screen pattern cell.

18. An apparatus in accordance with claim 14, wherein said means for rearranging the order of grayscale levels of said stored first screen pattern pixels of said stored first screen pattern cell to generate said second screen pattern cell having a second grayscale order of stored screen pattern pixels further comprises:

means for selecting each of said screen pattern pixels in said first screen pattern cell in grayscale order after combining said function with each respective said screen pattern pixels of said first screen pattern cell; and means for assigning the order of grayscale level of each said stored screen pattern pixels in said second screen pattern cell in the same order as said grayscale order of said modified first screen pattern cell after combining said function with each said screen pattern pixel of said first screen pattern cell.

19. An apparatus in accordance with claim 14, wherein said means for combining said function with said first screen pattern cell to alter the respective grayscale levels of pixels adjacent to said each stored first screen pattern pixel includes wrapping around portions of said function in areas located outside of said first screen pattern cell, to modify respective screen pattern pixels inside of said first screen pattern cell.

20. An apparatus in accordance with claim 14, wherein said means for combining said function with said first screen pattern cell to alter the respective grayscale levels of pixels adjacent to said each stored first screen pattern pixel includes wrapping around portions of said function in areas located outside of said first screen pattern cell to modify respective screen pattern pixels in proportion to the respective probability that each portion of said function located in areas outside of said first screen pattern cell corresponds to a pixel located inside of said first screen pattern cell.

21. An apparatus in accordance with claim 13, wherein said means for rearranging the order of grayscale levels of said stored first screen pattern pixels of said stored first screen pattern cell to generate a second screen pattern cell having a second grayscale order of stored screen pattern pixels comprises:

a) means for setting a reference cell equal to said first screen pattern cell;

b) means for setting a new cell to an initial reset state;

c) means for selecting the lightest pixel in said reference cell and marking the corresponding pixel in said new cell as the first gray shade in the grayscale order of said new cell;

d) means for adding a bump function to the chosen pixel in said reference cell, said bump function darkening the chosen pixel and nearby pixels in said reference cell;

e) means for selecting the next darker pixel in said reference cell excluding previously selected pixels, and marking the corresponding pixel in said new cell as the second gray shade in the grayscale order of said new cell;

f) means for adding said bump function to said selected next darker pixel in said reference cell, said bump function darkening said next darker pixel and nearby pixels in said reference cell;

g) means for repeating steps e) and f) until all pixels in said reference cell have been selected in grayscale order from the lightest to the darkest; and h) means for using said new cell as said second screen pattern cell.

22. An apparatus in accordance with claim 14, wherein the means for combining said function with said first screen pattern cell to alter the respective grayscale levels of pixels adjacent to said each stored first screen pattern pixel includes, for each of a plurality of second screen pattern pixels, means for using the value of said function applied to an offset of said second screen pattern pixel relative to said each stored first screen pattern pixel in said generated screen pattern.

23. An apparatus in accordance with claim 22, further including means for using portions of said function applied to a plurality of offsets of said screen pattern pixel relative to said each stored first screen pattern pixel, said portions being proportional to the relative probabilities of said offsets in said generated screen pattern.

24. An apparatus in accordance with claim 23, wherein a portion of said function is used for each of said plurality of offsets, said portion being proportional to relative probability of said offset occurring in said generated screen pattern.

* * * * *